US012618179B2

(12) United States Patent
Flynn et al.

(10) Patent No.: US 12,618,179 B2
(45) Date of Patent: May 5, 2026

(54) DEDUST COMPOSITIONS FOR TREATMENT OF MINERAL FIBERS

(71) Applicant: CARGILL, INCORPORATED, Wayzata, MN (US)

(72) Inventors: Ryan L. Flynn, Plymouth, MN (US); Frank P. Lochel, Rock Hill, SC (US); Peter James Tollington, Rotterdam (NL)

(73) Assignee: CARGILL, INCORPORATED, Wayzata, MN (US)

( * ) Notice: Subject to any disclaimer, the term of this patent is extended or adjusted under 35 U.S.C. 154(b) by 588 days.

(21) Appl. No.: 17/432,047

(22) PCT Filed: Feb. 21, 2019

(86) PCT No.: PCT/US2019/018923
§ 371 (c)(1),
(2) Date: Aug. 18, 2021

(87) PCT Pub. No.: WO2020/171815
PCT Pub. Date: Aug. 27, 2020

(65) Prior Publication Data
US 2022/0298688 A1      Sep. 22, 2022

(51) Int. Cl.
| | |
|---|---|
| *D04H 1/587* | (2012.01) |
| *C03C 13/06* | (2006.01) |
| *D04H 1/4209* | (2012.01) |
| *D04H 1/64* | (2012.01) |
| *C08L 91/00* | (2006.01) |
| *C08L 91/06* | (2006.01) |
| *C08L 91/08* | (2006.01) |

(52) U.S. Cl.
CPC ............. *D04H 1/587* (2013.01); *C03C 13/06* (2013.01); *D04H 1/4209* (2013.01); *D04H 1/64* (2013.01); *C03C 2213/00* (2013.01); *C08L 91/00* (2013.01); *C08L 91/06* (2013.01); *C08L 91/08* (2013.01)

(58) Field of Classification Search
CPC ........ D04H 1/587; D04H 1/4209; D04H 1/64; C03C 13/06; C03C 2213/00; C08L 91/00; C08L 91/06; C08L 91/08
USPC ........................................................ 427/221
See application file for complete search history.

(56) References Cited

U.S. PATENT DOCUMENTS

| | | | | | |
|---|---|---|---|---|---|
| 3,691,106 | A | * | 9/1972 | Erdy .................... | C11D 3/3773 |
| | | | | | 510/476 |
| 4,051,056 | A | * | 9/1977 | Hartman .............. | C11D 3/1293 |
| | | | | | 510/369 |
| 6,187,501 | B1 | * | 2/2001 | Aylward .................. | G03C 8/52 |
| | | | | | 503/227 |
| 8,765,985 | B2 | * | 7/2014 | Hora ......................... | C11B 3/08 |
| | | | | | 508/459 |
| 8,864,893 | B2 | | 10/2014 | Hawkins et al. | |
| 8,980,807 | B2 | * | 3/2015 | Hora ......................... | C11B 3/14 |
| | | | | | 508/459 |
| 2004/0047886 | A1 | | 3/2004 | Murphy | |
| 2004/0221504 | A1 | * | 11/2004 | Murphy .................. | C11C 5/002 |
| | | | | | 44/275 |
| 2007/0004811 | A1 | | 1/2007 | Bruner et al. | |
| 2009/0247575 | A1 | | 10/2009 | Asotra | |
| 2010/0279573 | A1 | * | 11/2010 | Sinnige ............... | C04B 40/0039 |
| | | | | | 524/313 |
| 2013/0066090 | A1 | * | 3/2013 | Hora .................... | C10M 101/04 |
| | | | | | 554/135 |
| 2014/0083328 | A1 | * | 3/2014 | Lochel, Jr. ............. | C09J 103/02 |
| | | | | | 106/217.7 |
| 2015/0152350 | A1 | * | 6/2015 | Hora ........................ | C11B 3/001 |
| | | | | | 508/459 |
| 2017/0022398 | A1 | * | 1/2017 | Lochel, Jr. ............. | C03C 25/321 |
| 2018/0020715 | A1 | * | 1/2018 | Karremans ............. | A21D 2/186 |
| | | | | | 426/96 |
| 2018/0305589 | A1 | * | 10/2018 | Lochel, Jr. ............. | E04B 1/7662 |
| 2018/0334603 | A1 | * | 11/2018 | Bahr ......................... | E01C 7/08 |
| 2022/0298688 | A1 | * | 9/2022 | Flynn ...................... | C08L 91/00 |

FOREIGN PATENT DOCUMENTS

| | | | | |
|---|---|---|---|---|
| WO | 2010/135630 A1 | 11/2010 | | |
| WO | 2010/135637 A1 | 11/2010 | | |
| WO | 2010/135694 A2 | 11/2010 | | |
| WO | 2011/146856 A1 | 11/2011 | | |
| WO | WO-2011146848 A1 | * | 11/2011 | ............. C11B 3/001 |
| WO | 2012/166414 A1 | 12/2012 | | |
| WO | 2015/138958 A1 | 9/2015 | | |

OTHER PUBLICATIONS

Ng et al, "Compositional and thermal characteristics of palm olein-based diacylglycerol in blends with palm superolein," Food Research International, Elsevier, Amsterdam, NL, vol. 55, Oct. 26, 2013, pp. 62-69.
Zulhanafi P. et al., "The tribological performances of Super Olein as fluid lubricant using four-ball tribotester," Tribology International, vol. 130, Feb. 1, 2019, pp. 85-93.

* cited by examiner

*Primary Examiner* — Brian K Talbot

(57) ABSTRACT

Dedust compositions suitable for use as dedust oil for mineral wool applications comprise a) from 95 percent by weight to 99.99 percent by weight of a triacyl glyceride sourced from a plant or animal oil, the triacyl glyceride having an IV of from 45 to 70, a viscosity at 30 C of from 30 mPa·s to 80 mPa·s, and a Solid Fat Content of 15% w/w or less at 10 C; and b) from 100 ppm to 2,500 ppm of an antioxidant. The dedust composition exhibits a flash point of at least 280 C. In aspects, the dedust composition is liquid at 23 C. In aspects, the triacyl glyceride is palm super olein.

19 Claims, No Drawings

DEDUST COMPOSITIONS FOR TREATMENT OF MINERAL FIBERS

CROSS-REFERENCE TO RELATED APPLICATIONS

This application is a national phase of International Application No. PCT/US2019018923, filed Feb. 21, 2019, which is hereby incorporated by reference herein in its entirety.

FIELD

The present invention relates to mineral fiber processing and dedust compositions.

BACKGROUND

Conventional fibers are useful in a variety of bonded fiber-containing products (i.e. products where fibers are bonded together by a binder composition), such as rein-forcements, textiles, and acoustical and thermal insulation materials. Various fibers may be used in these products, including glass fibers; organic fibers such as polypropylene, polyester; and multi-component fibers may be used alone or in combination in forming the fiber-containing product. Fiberglass is a composite material comprising glass fibers. Glass fibers are hydrophilic, unless the fibers are modified by a surface treatment. Mineral wool is a composite material comprising mineral fibers. Mineral fibers are composition-ally different from glass fibers material, and are also used in the above noted applications. Mineral fibers are made from rock (primarily basalt) and/or slag, and, unless modified by a surface treatment, are hydrophobic. Mineral fibers made from rock are also called "stone fibers." Specific types of mineral wools include stone wool and slag wool (which are made from stone fiber or slag fiber, respectively).

Dust is often liberated or generated during the formation of products made from glass fibers or from mineral fibers, such as products used for insulation, filtration, soundproof-ing, and the like. A dedust fluid is often applied to the glass or mineral fibers during the process to reduce this dust. The dust controlling oil remains on the fibers and continues to control dust during transport and installation of the product. Mineral-oil based fluids are often utilized as dedust fluids. In particular, a category of solvent-extracted mineral base oils known as "bright stock" has been used as a dedust compo-sition in stone fiber processing.

The use of polymerized oil as a dust control agent is described in US Patent Application Publication No. 2007/0004811 to Bruner et al.

SUMMARY

Historically, dedust fluids have been prepared from petro-leum sources, and in particular mineral-oil based fluids are often utilized as dedust fluids. It is desirable to identify dedust fluids that are sourced from renewable resources, such as plant-based oils or animal-based oils.

In an aspect of the present invention, a dedust composi-tion is provided that is suitable for use as dedust oil for mineral wool applications. In an aspect, the dedust compo-sition comprises a) from 95 percent by weight to 99.99 percent by weight of a triacyl glyceride sourced from a plant or animal oil, the triacyl glyceride having an IV of from 50 to 70, and a viscosity at 30° C. of from 30 mPa·s to 80 mPa·s;

and b) from 100 ppm to 2,500 ppm of an antioxidant; wherein the dedust composition exhibits a flash point of at least 280° C.

In an aspect, a dedust composition suitable for use as dedust oil for mineral wool applications is provided com-prising a) from 95 percent by weight to 99.99 percent by weight of a triacyl glyceride, the triacyl glyceride having an IV from 50 to 70, and a viscosity at 30° C. of from 30 mPa·s to 80 mPa·s; and b) from 100 ppm to 2,500 ppm of an antioxidant; wherein the dedust composition exhibits a flash point of at least 280° C., and wherein the dedust composition is liquid at 23° C.

In an aspect, a dedust composition suitable for use as dedust oil for mineral wool applications is provided com-prising a) from 95 percent by weight to 99.99 percent by weight palm super olein; and b) from 100 ppm to 2,500 ppm of an antioxidant.

The dedust compositions as described herein advanta-geously are compatible with and very effective for use with mineral wool. Moreover, the present dedust compositions may be prepared from readily available materials that require little or no additional processing or chemical reac-tion that may introduce undesirable byproducts or contami-nants.

Because the present triacyl glycerides may be made using animal or plant-based oils (which are a renewable resource), the present dedust compositions are natural in origin and more readily biodegradable.

DETAILED DESCRIPTION

The aspects of the present invention described below are not intended to be exhaustive or to limit the invention to the precise forms disclosed in the following detailed descrip-tion. Rather a purpose of the aspects chosen and described is by way of illustration or example, so that the appreciation and understanding by others skilled in the art of the general principles and practices of the present invention can be facilitated.

For purposes of the present invention, "Flash Point" or "Flash Point Temperature" is a measure of the minimum temperature at which a material will initially flash with a brief flame. It is measured according to the method of ASTM D-92 using a Cleveland Open Cup and is reported in degrees Celsius (° C.).

For purposes of the present invention, "Iodine Value" (IV) is defined as the number of grams of iodine that will react with 100 grams of material being measured. Iodine value is a measure of the unsaturation (carbon-carbon double bonds and carbon-carbon triple bonds) present in a material. Iodine Value is reported in units of grams iodine ($I_2$) per 100 grams material and is determined using the procedure of AOCS Cd Id-92.

For purposes of the present invention, "mineral fiber" is fiber made from molten rock, basalt or slag. Sources of mineral fiber include iron slag, limestone, volcanic rock, ceramic, and the like.

For purposes of the present invention, the stability of the triacyl glyceride (i.e. not including antioxidants or added emulsifiers) with respect to oxidation is determined by determining the Oxidation Induction Time ("OTT") as mea-sured under ASTM D6186-98 at the stated temperatures. The OIT test is carried out at an air pressure of 500+/−25 psig and an airflow rate of 100+/−10 ml/min.

For purposes of the present invention, "Slip melting point" is measured in accordance with AOCS Official Method Cc 3b-92, Method A using a capillary tube having uniform walls and that are open at both ends, of internal diameter of 1.0 mm, an external diameter of 1.4 mm, wall thickness 0.15-0.2 mm and a length of 100 mm.

For purposes of the present invention, "Solid Fat Content" is measured in accordance with AOCS Official Method Cc 16b-93 entitled "Solid Fat Content (SFC) by Low-Resolution Nuclear Magnetic Resonance—The Direct Method."

For purposes of the present invention, "viscosity" is measured by ASTM D445 using the Cannon Ubbelohde tubes identified in Table 1 of this ASTM. Viscosity is reported in centistokes ("cSt").

In an aspect, the dedust composition comprises from 95 percent by weight to 99.99 percent by weight of a triacyl glyceride. In an aspect, the dedust composition comprises from 98 percent by weight to 99.99 percent by weight of a triacyl glyceride.

In an aspect, the triacyl glyceride has an IV of from 45 to 70. It has been found that this IV range is advantageous because triacyl glycerides having iodine values greater than 70 are subject to oxidation after exposure to high temperature ovens, such as are used in most dedust uses associated with mineral wool applications. High temperatures have been found to initiate formation of peroxides that do not dissipate completely. Residual peroxides lead to continued oxidation of the final product, even at room temperature during storage. The resulting byproducts, such as aldehydes, that are formed lead to generation of a strong, undesirable odor, which can cause the final product (e.g. insulation) to be unsaleable or even unusable.

In an aspect, the triacyl glyceride has an IV of from 50 to 70. In an aspect, the triacyl glyceride has an IV of from 50 to 65. In an aspect, the triacyl glyceride has an IV of from 60 to 70.

In an aspect, the triacyl glyceride has a Slip melting point of 21° C. or less. It has been found that this slip melting point range is advantageous because dedust compositions made from materials with higher slip melting points are not as effective in capturing dust in the resulting final product. In an aspect, the triacyl glyceride has a Slip melting point of less than 10° C. In an aspect, the triacyl glyceride has a Slip melting point of 20° C. or less. In an aspect, the triacyl glyceride has a Slip melting point of 19° C. or less. In an aspect, the triacyl glyceride has a Slip melting point of from 10° C. to 21° C. In an aspect, the triacyl glyceride has a Slip melting point of from 12° C. to 20° C. In an aspect, the triacyl glyceride has a Slip melting point of from 14° C. to 19° C.

In an aspect, the triacyl glyceride has a viscosity at 30° C. of from 30 mPa·s to 80 mPa·s. It has been found that triacyl glyceride of this viscosity range is advantageous because the triacyl glyceride exhibits good flow characteristics during use and can effectively contact and distribute over the mineral fibers being treated. Additionally, it has been found that triacyl glyceride of this viscosity range exhibits excellent handling characteristics during all aspects of composition manufacture and use. In an aspect, the triacyl glyceride has a viscosity at 30° C. of from 40 mPa·s to 70 mPa·s. In an aspect, the triacyl glyceride has a viscosity at 30° C. of less than 60 mPa·s. In an aspect, the triacyl glyceride has a viscosity at 40° C. of from 30 mPa·s to 60 mPa·s. In an aspect, the triacyl glyceride has a viscosity at 40° C. of from 30 mPa·s to 45 mPa·s. In an aspect, the triacyl glyceride has a viscosity at 40° C. of from 35 mPa·s to 45 mPa·s.

In an aspect, the triacyl glyceride has a Solid Fat Content of 15% w/w or less at 10° C. In an aspect, the triacyl glyceride has a Solid Fat Content of 10% w/w or less at 10° C. In an aspect, the triacyl glyceride has a Solid Fat Content of 5% w/w or less at 10° C.

In an aspect, the triacyl glyceride has a Solid Fat Content of 20% w/w or less at 5° C. In an aspect, the triacyl glyceride has a Solid Fat Content of 15% w/w or less at 5° C. In an aspect, the triacyl glyceride has a Solid Fat Content of 10% w/w or less at 5° C.

In an aspect, the triacyl glyceride has a Solid Fat Content of 25% w/w or less at 0° C. In an aspect, the triacyl glyceride has a Solid Fat Content of 20% w/w or less at 0° C. In an aspect, the triacyl glyceride has a Solid Fat Content of 15% w/w or less at 0° C.

In an aspect, the triacyl glyceride has a Solid Fat Content of 20% w/w or less at 0° C. and a Solid Fat Content of 10% w/w or less at 5° C. and a Solid Fat Content of 2% w/w or less at 10° C.

In an aspect, the triacyl glyceride is a non-titering at 23° C.

In an aspect, from 30 to 45 percent of the fatty acids of the triacyl glyceride are saturated fatty acids. In an aspect, from 30 to 45 percent of the fatty acids of the triacyl glyceride are the sum of C16 and C18 saturated fatty acids. In an aspect, from 30 to 45 percent of the fatty acids of the triacyl glyceride are the sum of C16 and C18 saturated fatty acids, of which from 3 to 5 percent of the fatty acids of the triacyl glyceride are saturated C18 fatty acids. For purposes of the present disclosure, the fatty acid content is determined by ISO 12966.

It has been found that it is particularly desirable to prepare dedust compositions from materials that are sourced from renewable resources where the majority of the materials in the composition have little or no chemical modification as compared to the naturally obtained raw starting materials. In an aspect, the triacyl glyceride is obtained from an animal- or plant-based oil that has been processed only by fractionation, i.e., heating to temperature of from about 40 to 80° C., cooling, and separating the resulting solid oil components from liquid components by filtration. For purposes of the present discussion, separation of components by fractionation as described herein is not considered a chemical modification of the triacyl glyceride, because the triacyl glyceride is not chemically reacted to form a modified chemical compound per se. In an aspect, the ingredients of the present dedust compositions are selected from materials that already meet the requirements of the European Union regulations known as Registration, Evaluation, Authorisation and Restriction of Chemicals ("REACH").

In an aspect, the triacyl glyceride is a material that has not been blown or bodied. In an aspect, the triacyl glyceride is a material that has not been exposed to a processing temperature above 100° C. for a time sufficient to chemically alter the triacyl glyceride prior to formulation in the dedust composition as described herein. In an aspect, the triacyl glyceride is a material that has not been exposed to a processing temperature above 90° C. for a time sufficient to chemically alter the triacyl glyceride prior to formulation in the dedust composition as described herein.

In an aspect, the triacyl glyceride is a refined, bleached and deodorized triacyl glyceride.

In an aspect, the triacyl glyceride is a plant-based oil.

In an aspect, the triacyl glyceride is obtained from a starting material plant-based oil is selected from soybean oil, canola oil, rapeseed oil, cottonseed oil, sunflower oil, palm oil, peanut oil, safflower oil, corn oil, safflower oil, corn stillage oil, and mixtures thereof. In an aspect, the triacyl glyceride is obtained from palm oil. In an aspect, the triacyl glyceride is palm super olein.

Palm super olein is a liquid fraction of palm oil obtained by fractionation of the palm oil. In an aspect, the palm super olein is obtained by cooling the palm oil and filtering to separate liquid oil from crystals formed in the cooling process.

In an aspect, the dedust composition comprises from 100 ppm to 2,500 ppm of an antioxidant. In an aspect, the dedust composition comprises from 150 ppm to 2000 ppm of an antioxidant. In an aspect, the dedust composition comprises from 200 ppm to 500 ppm of an antioxidant. It has been discovered that even though the triacyl glyceride as described herein is selected to have a relatively low IV of from 50 to 70, over time oxidation of the dedust composition may occur, leading to generation of the strong, undesirable odors described above. Incorporation of antioxidants in the dedust compositions as described herein are effective in preventing formation of aldehydes in final products prepared using the present deduct compositions. The resulting final products do not generate undesirable odors that would adversely affect the value of the product, as discussed above.

In an aspect, the antioxidant comprises a mixture of antioxidants. In an aspect, the mixture of antioxidants are selected from antioxidants that are activated at different temperatures, comprising a first antioxidant providing high-temperature antioxidant protection against oxidation in a process/curing oven, and a second antioxidant providing low-temperature antioxidant protection against oxidation in post-process storage to protect against longer-term rancidity. In an aspect, the antioxidant comprises a hindered phenol or mixtures of hindered phenols. In an aspect, the hindered phenol antioxidant is selected from the group consisting of hindered phenols having a molecular weight above 500 Da.

In an aspect, the antioxidant is selected from the group consisting of 2,4-dimethyl-6-octyl-phenol; 2,6-di-t-butyl-4-methyl phenol (i.e., butylated hydroxy toluene—BHT); 2 butyl-4-methoxyphenol and 3-t-butyl-4-methoxyphenol (BHA); 2,6-di-t-butyl-4-ethyl phenol; 2,6-di-t-butyl-4-n-butyl phenol; 2,4-dimethyl-6-t-butyl phenol; 4-hydroxymethyl-2,6-di-t-butyl phenol; n-octadecyl-beta(3,5-di-t-butyl-4-hydroxyphenyl)propionate; 2,6-dioctadecyl-4-methyl phenol; 2,4,6-trimethyl phenol; 2,4,6-triisopropyl phenol; 2,4,6-tri-t-butyl phenol, 2-t-butyl-4,6-dimethyl phenol; 2,6-methyl-4-didodecyl phenol; benzenepropanoic acid, 3,5-bis (1,1-dimethylethyl)-4-hydroxy-, $C_{7-9}$-branched alkyl ester (Irganox L-135); 2,2'-methylene-bis(4-methyl-6-t-butyl phenol); 2,2'-methylenebis(4-ethyl-6-t-butyl phenol); 4,4'-methylene-bis(2,6-di-tert-butylphenol); 4,4'-bis(2,6-di-tert-butylphenol); 4,4'-bis(2-methyl-6-tert-butylphenol); 4,4'-butyldene-bis(3-methyl-6-tert-butyl phenol); 4,4'-isopropylidene-bis(2,6-di-tert-bulylphenol); 2,2'-methylene-bis(4-methyl-6-nonylphenol); 2,2'-isobutylidene-bis(4,6-dimethylphenol); 2,2'-methylene-bis(4-methyl-6-cyclohexylphenol); bis(3,5-di-tert-butyl-4-hydroxybenzyl); tris(3,5-di-t-butyl-4-hydroxy isocyanurate; tris(2-methyl-4-hydroxy-5-t-butyl phenyl)butane pentaerythritol tetrakis(3-(3,5-di-tert-butyl-4-hydroxyphenyl)propionate); hexamethylene bis[3-(3,5-di-tert-butyl-4-hydroxyphenyl)propionate]; thiodiethylene bis[3-(3,5-di-tert-butyl-4-hydroxyphenyl) propionate; 2,6-di-tert-dimethylamino-p-cresol; 2,6-di-tert-4-(N,N'-dimethylaminomethylphenol); 4,4'-thiobis(2-methyl-6-tert-butylphenol); 2,2'-thiobis(4-methyl-6-tert-butylphenol); and bis(3-methyl-4-hydroxy-5-tert-butylbenzyl)-sulfide.

In an aspect, the antioxidant is selected from the group consisting of diphenylamine-type oxidation inhibitors, including alkylated diphenylamine, phenyl-α-naphthylamine, and alkylated-α-naphthylamine. Other types of antioxidants include metal dithiocarbamate (e.g., zinc dithiocarbamate), and methylenebis(dibutyldithiocarbamate).

In an aspect, the antioxidant is selected from the group consisting of octadecyl-3,5-di-t-butyl-4-hydroxy-hydrocinnamate (NAUGARD 76, Uniroyal Chemical; IRGANOX 1076, Ciba-Geigy); tetrakis{methylene(3,5-di-t-butyl-4-hydroxy-hydrocinnamate)}methane (NAUGARD 10, Uniroyal Chemical; IRGANOX 1010, Ciba-Geigy); 2,2'-oxamido bis{ethyl-3-(3,5-di-t-butyl-4-hydroxyphenyl)}propionate (NAUGARD XL-1, Uniroyal Chemical); 1,2-bis(3, 5-di-t-butyl-4-hydroxyhydrocinnamoyl)hydrazine (IRGANOX MD 1024, Ciba-Geigy); 1,3,5-tris(3,5-di-t-butyl-4-hydroxybenzyl)-s-triazine-2,4,6 (1H,3H,5H)trione (IRGANOX 3114,Ciba-Geigy); 1,3,5-tris(4-t-butyl-3-hydroxy-2,6-dimethylbenzyl)-s-triazine-2,4,6-(1H,3H,5H)trione (CYANOX 1790, American Cyanamid Co.); 1,3,5-trimethyl-2,4,6-tris(3,5-di-t-butyl-4-hydroxybenzyl) benzene (ETHANOX 330, Ethyl Corp.); 3,5-di-t-butyl-4-hydroxyhydrocinnamic acid triester with 1,3,5-tris(2-hydroxyethyl)-5-triazine-2,4,6(1H,3H,5H)-trione, and bis(3, 3-bis(4-hydroxy-3-t-butylphenyl)butanoic acid)glycolester.

In an aspect, the triacyl glyceride has an OIT of at least 22 minutes at 130° C.; or the triacyl glyceride has an OIT of at least 25 minutes at 130° C.; or the triacyl glyceride has an OIT of at least 28 minutes at 130° C.; or the triacyl glyceride has an OIT of at least 30 minutes at 130° C.

In an aspect, the dedust composition has a flash point of at least about 280° C. In an aspect, the dedust composition has a flash point of at least 285° C. In an aspect, the dedust composition has a flash point of at least 293° C. In an aspect, the dedust composition has a flash point of at least 290° C. In an aspect, the dedust composition has a flash point of at least 296° C. In an aspect, the dedust composition has a flash point of at least 304° C. In an aspect the dedust composition has a flash point of at least 320° C. In an aspect, the dedust composition has a flash point of from about 280° C. to about 400° C. In an aspect, the dedust composition has a flash point of from about 285° C. to about 350° C. In an aspect, the dedust composition has a flash point of from about 290° C. to about 325° C.

In an aspect, the dedust composition may optionally comprise minor amounts of compatible components, such as mineral oils or animal or plant-based oils that otherwise would not meet the specifications of the presently recited triacyl glycerides. For example, the dedust composition optionally may comprise 1% by weight of a soybean oil.

In an aspect, the dedust composition may optionally comprise minor amounts of oil thickeners added to improve adhesion of the oil to the fibers and/or control the film thickness of the oil on the fibers.

In an aspect, the dedust composition comprises an emulsifying agent or mixtures of emulsifying agents. It has been found that incorporation of an emulsifying agent is desirable, because it facilitates mixing of the dedust composition with an aqueous dispersion binder composition in the ultimate use of the dedust composition. In an aspect, the dedust composition comprises an emulsifying agent present as from about 1 to 3 wt % of the dedust composition. It should in particular be noted that the emulsifier may be selected from compounds that comprise a triacyl glyceride functionality. Such added emulsifiers are not to be considered as part of the "component a) triacyl glyceride" for determining the required properties of the component a) triacyl glyceride, such as IV, slip melting point, and the like.

In an aspect, the emulsifier is selected from non-ionic emulsifiers and mixtures of non-ionic emulsifiers. In an aspect the non-ionic emulsifiers are selected from alkoxylated alcohols, alkoxylated fatty acids, and mixtures thereof. In an aspect the non-ionic emulsifiers are selected from ethoxylated alcohols, ethoxylated fatty acids, and mixtures thereof. In an aspect the non-ionic emulsifiers are selected from one or more ethoxylated alcohols. In an aspect, the non-ionic emulsifier is selected from the group consisting of ethoxylated castor oil. In an aspect, the non-ionic emulsifier is selected from castor oil ethoxylated with from 5 to 40 moles of ethylene oxide that are blended to an HLB of from about 6 to about 11. In an aspect, the non-ionic emulsifier is selected from castor oil ethoxylated with from 5 to 40 moles of ethylene oxide that are blended to an HLB of from about 6 to about 8. In an aspect, the non-ionic emulsifier is selected from castor oil ethoxylated with from 5 to 40 moles of ethylene oxide that are blended to an HLB of from about 9 to about 11. In an aspect, the castor oil ethoxylated with from 5 to 16 moles of ethylene oxide, the resulting ethoxylated castor oils being blended to an HLB of from about 6 to about 11. In an aspect, the castor oil ethoxylated with from 5 to 16 moles of ethylene oxide, the resulting ethoxylated castor oils being blended to an HLB of from about 6 to about 8. In an aspect, the castor oil ethoxylated with from 5 to 16 moles of ethylene oxide, the resulting ethoxylated castor oils being blended to an HLB of from about 9 to about 11. In an aspect, the non-ionic emulsifier is selected from oleate esters of ethoxylated glycerol and sorbitol. In an aspect, the glycerol is ethoxylated with from 15 to 35 moles of ethylene oxide, or the glycerol is ethoxylated with from 20 to 30 moles of ethylene oxide. In an aspect, the sorbitol is ethoxylated with from 30 to 50 moles of ethylene oxide; or the sorbitol is ethoxylated with from 35 to 45 moles of ethylene oxide.

In an aspect, the emulsifier is an ionic emulsifier or a mixture of ionic emulsifiers. In an aspect, the ionic emulsifiers are selected from amine-based emulsifiers. In an aspect, the ionic emulsifiers are selected from primary, secondary, tertiary, and quaternary amine-based emulsifiers.

In an aspect, the dedust composition may be applied to mineral wool fibers in an oil-based solution or as a neat solution.

In an aspect, the dedust composition is provided as a pre-emulsion composition in combination with emulsifiers, ready for addition of water.

In an aspect, the dedust composition as described herein is combined with water to form an emulsion, which is ready for application to wool fibers in the form of an emulsion.

In an aspect, the dedust composition as described herein in an oil-based solution or as a neat solution is mixed with a binder composition as discussed below, which mixture is ready for application to wool fibers.

In an aspect, the dedust composition as described herein is combined with water to form an emulsion and is mixed with a binder composition as discussed below, which mixture is ready for application to wool fibers.

If the dedust composition is in the form of an oil in water emulsion, then in an aspect at least one emulsifying component is utilized to form the oil in water emulsion. The emulsion typically is formed by vigorously agitating the water and the oil components of the dedust composition (i.e. the triacyl glyceride and any other oil components that may optionally be added in small amounts) in the presence of the at least one emulsifying component. Examples of apparatus that can be utilized to effectively used to form the oil in water emulsion include high shear mechanical devices/mixers, ultrasonic devices, and other equipment/devices known to those of skill in the art for use in forming oil in water emulsions. In an aspect, the weight ratio of the at least one emulsifying components to the oil components of the dedust composition is from 1:200 to 15:100, for example from 1:200 to 5:100, from 1:200 to 3:100 by weight.

In one aspect the at least one emulsifying component comprises a single emulsifier that is utilized to form the emulsion. In this aspect, the emulsifier typically is mixed into the oil components of the dedust composition before water is introduced to form the emulsion. Examples of emulsifiers that can be utilized include, for example, ionic emulsifiers, non-ionic emulsifiers and mixtures thereof. To minimize competing reactions between the emulsifier and the components of the aqueous curable binder composition, non-ionic emulsifiers preferably are utilized.

In another aspect, the at least one emulsifying component comprises a first emulsifying component that is blended into the oil components of the dedust composition, and a second emulsifying component that is blended into the water that is utilized to form the oil in water emulsion with the oil. Preferably, in this aspect the first emulsifying component and the second emulsifying component are mixed into the oil and water respectively before the oil and water are mixed together to form the oil in water emulsion.

Examples of compounds that may be used for the first emulsifying component include the emulsifiers listed above. Examples of compounds that may be used for the second emulsifying component include: carboxymethylcellulose; maltodextrin; carbohydrates; polyols; natural viscosifiers, such as, xanthan gum, guar gum, schleroglucan; and mixtures thereof. Preferably, the second emulsifying component will increase the viscosity of the water and assist the formation of the oil in water emulsion and enhance the long term stability of the oil in water emulsion. For example, preferably the second emulsifying component will provide an aqueous-based solution having a viscosity of from 15 to 35 centipoise at 25° C., for example from 17 to 33 centipoise at 25° C., preferably from 18 to 25 centipoise at 25° C. for an aqueous solution containing less than 1 percent by weight of the second emulsifying component, preferably less than 0.5 percent by weight (for example less than 0.3 percent by weight) of the second emulsifying component. For stability, in some aspects, the oil in water emulsion will be stable for at least 4 hours, more preferably at least 14 hours and in some instances at least 24 hours (for example, at least 48 hours, 72, hours, 96, hours, or 120 hours. Where long term stability is particularly important, the oil in water emulsion will be stable for at least one week, and in some instances at least two weeks (for example, at least three weeks). Preferably the second emulsifying component comprises carboxymethylcellulose.

In an aspect, the dedust composition as described above may be used as part of a system for manufacture of any bonded mineral fiber-containing products. In an aspect the dedust composition is used as part of a system for manufacture of a bonded mineral fiber-containing product selected from the group consisting of reinforcement material, textiles, acoustical insulation material, and thermal insulation material.

The dedust composition typically is applied concurrently to the fibers with a curable binder composition. In an aspect, the dedust composition is applied concurrently to the fibers with an aqueous curable binder composition.

In an aspect, the system for manufacture of any bonded mineral fiber-containing products comprises a dedust composition as described herein and a binder composition.

In an aspect, the binder composition to be used with the dedust composition in the system is a petroleum-based binder system comprising an aqueous curable binder composition.

In an aspect, the binder composition to be used with the dedust composition in the system is a bio-based binder system comprising an aqueous curable binder composition. In an aspect, the aqueous curable binder composition comprises (i) at least one carbohydrate, for example maltodextrin, having a dextrose equivalent number from 2 to 20; and (ii) at least one crosslinking agent, for example citric acid. In an aspect, the binder compositions are those described in United States Patent Application Publication No. 2014/0083328, titled "BIO-BASED BINDER SYSTEMS," the disclosure of which is incorporated herein by reference.

In an aspect, a binder/dedust mixture composition for use in making a bonded mineral fiber-containing product comprises a mixture of a) the dedust composition as described herein with b) with a binder composition. It has been found that the dedust compositions as described herein can be formulated with a binder composition to provide a compatible composition, so that the resulting binder/dedust mixture composition may be effectively applied to mineral fibers under ordinary conditions of use in preparation of bonded mineral fiber-containing products.

In an aspect, a method of making a bonded mineral fiber-containing product comprises mixing a dedust composition as described above with a binder composition to form a binder/dedust mixture, and applying the binder/dedust mixture to mineral fibers. The binder/dedust mixture can be applied to the mineral fibers before or during product formation in any suitable manner, such as by spraying. The mineral fibers are collected and compressed in the shape of the desired product, such as a non-woven mineral wool mat, and heated to cure the binder. In an aspect, heating is carried out in an oven. In an aspect, heating is carried out in a hot mold to form the desired end product. The applied heat causes the binder to cure, thereby binding the mineral fibers together at sites where they overlap. Through the curing of the binder in this manner, the bonded mineral fiber-containing product is formed. The cured binder imparts strength and resiliency to the mineral fiber product, allowing the fibers to retain their shape.

Typically, excluding the weight of any water present in the dedust composition, the dedust composition is present in a cured mineral wool insulation product of the invention at a weight percent of from about 0.1 to about 5% by weight of mineral fiber present (for example, from about 0.5 to about 4.0%, or from about 0.5% to about 3.0% by weight (and in some instances from 0.6% to 1.5% by weight) of the mineral fiber present). Excluding the weight of water, the weight ratio of the dedust composition to the solids of the aqueous curable binder composition is from about 1/100 to 34/100, for example from about 6/100 to 13/100, from about 4/100 to 10/100.

EXAMPLES

Example 1. Dedust Composition a. INGREDIENTS (1000 g basis)
   1) triacyl glycerin—980 g palm super olein
   2) EMULSIFIER—10 g, Tagat TO V emulsifier ex Evonik—Glycereth-25 Trioleate 1.00% active
   3) EMULSIFIER—10 g Marlosol OL/7 emulsifier ex Sasol PEG-7 Mono oleate 100% active 4) ANTI-OXIDANT—0.2 g, Irganox L-135 (BASF) Antioxidant
b. PREPARATION OF DE-DUSTING OIL BLEND
   i. Weigh out and pre-warm all ingredients gently to 40° C.
   ii. Add the emulsifiers slowly to the superolein under gentle stirring, avoiding incorporation of air, and continue stirring for 5 mins
   iii. Add the anti-oxidant under gentle stirring, and continue stilling the oil mixture for an additional 10 mins
   iv. Take a small sample in a glass vial, and check for homogeneity and absence of solids (The emulsifiers and anti-oxidant are soluble in vegetable oil, so if non-homogeneity is observed it should be possible to overcome with an additional mixing period, 10 mins suggested)
   v. When the sample is clear and homogeneous, pour into a beaker, cover and leave to cool to ambient temperature Emulsion Test This test is to check that the formulated de-dusting oil demonstrates adequate self-emulsification properties.
   a. PREPARATION OF THE CONTROL SAMPLE: Put 90 g of room-temperature demineralized water into a 100 ml narrow glass measuring cylinder, and add 10 g of palm super olein. The vegetable oil should float almost immediately to the top, and form a. distinct layer.
   b. Put 180 g of room-temperature demineralized water into a narrow diameter glass beaker, apply a full-width paddle stirrer and commence vigorous stirring (400 rpm). A distinct vortex should be formed in the center of the beaker, if not increase the stirrer speed until one forms
   c. Add slowly 20 g of the oil mixture, and continue stirring vigorously for 5 mins—a milky homogeneous oil-in-water emulsion should form during this period.
   d. Remove the stirrer, and pour the emulsion rapidly into 2×100 ml narrow glass measuring cylinders (dimensions identical to that used to prepare the control sample). Start a timer
   e. Observe and note the formation of a separated oil layer over time. Volume gradations on the measuring cylinder, and the thickness of the oil layer in the control sample, allow the observer to estimate the % break of the emulsion.

The frequency of measurement of the separated oil layer should be adjusted according to the expected break time; more frequent measurements for shorter periods of stability.

In evaluation of the sample of Example 1, first-order separation kinetics was observed, which could be described approximately by $s=100(1-e^{-kt})$ where s is the % of separation of the oil layer, k is an empirical rate constant, and t is the time of measurement. When t is measured in minutes, a value of k of 0.35/min was calculated, which corresponds to 50% emulsion break after 2 mins and 75% after 4 mins.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value

11 or range of values stated by ⅟₁₀ of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of making a bonded mineral fiber-containing product comprising mixing a dedust composition exhibiting a flash point of at least 280° C. with a binder composition to form a binder/dedust mixture, wherein the dedust composition comprises:

a) from 95 percent by weight to 99.99 percent by weight of a triacyl glyceride sourced from a plant or animal oil, the triacyl glyceride having an IV of from 45 to 70, the triacyl glyceride has an Oxidation Induction Time (OIT) of at least 22 minutes at 130 C, a viscosity at 30° C. of from 30 mPas to 80 mPas, and a Solid Fat Content of 15% w/w or less at 10° C., wherein the triacyl glyceride has not been chemically reacted to form a modified chemical compound per se; and b) from 100 ppm to 2,500 ppm of an antioxidant;

applying the binder/dedust mixture to mineral fibers;

collecting and compressing the mineral fibers in the shape of the desired product; and curing the binder, thereby forming the bonded mineral fiber-containing product.

2. The method of claim 1, wherein the dedust composition is liquid at 23° C.

3. The method of claim 1, wherein the triacyl glyceride is palm super olein.

4. The method of claim 1, wherein the dedust composition comprises from 98 percent by weight to 99.99 percent by weight of a triacyl glyceride.

5. The method of claim 1, wherein the triacyl glyceride has an IV of from 50 to 70.

6. The method of claim 1, wherein the triacyl glyceride has a Slip melting point of 21° C. or less.

7. The method of claim 1, wherein the triacyl glyceride has a viscosity at 30° C. of from 40 mPa's to 70 mPa's and the triacyl glyceride has a viscosity at 40° C. of from 30 mPa's to 60 mPa·s.

8. The method of claim 1, wherein the triacyl glyceride has a Solid Fat Content of 10% w/w or less at 10° C.

9. The method of claim 1, wherein triacyl glyceride has a Solid Fat Content of 25% w/w or less at 0° C.

10. The method of claim 1, wherein from 30 to 45 percent of the fatty acids of the triacyl glyceride are saturated fatty acids.

11. The method of claim 1, wherein the dedust composition comprises from 150 ppm to 2000 ppm of an antioxidant.

12. The method of claim 1, wherein the antioxidant comprises a hindered phenol.

13. The method of claim 1, wherein the antioxidant is selected from the group consisting of 2,4-dimethyl-6-octylphenol; 2,6-di-t-butyl-4-methyl phenol (i.e., butylated hydroxy toluene-BHT); 2-t-butyl-4-methoxyphenol and 3-t-butyl-4-methoxyphenol (BHA); 2,6-di-t-butyl-4-ethyl phenol; 2,6-di-t-butyl-4-n-butyl phenol; 2,4-dimethyl-6-t-butyl phenol; 4-hydroxymethyl-2,6-di-t-butyl phenol; n-octadecyl-beta (3,5-di-t-butyl-4-hydroxyphenyl) propionate; 2,6-dioctadecyl-4-methyl phenol; 2,4,6-trimethyl phenol; 2,4,6-triisopropyl phenol; 2,4,6-tri-t-butyl phenol; 2-t-butyl-4,6-dimethyl phenol; 2,6-methyl-4-didodecyl phenol; benzenepropanoic acid, 3,5-bis(1,1-dimethylethyl)-4-hydroxy-, C7-9-branched alkyl ester (Irganox L-135); 2,2'-methylene-bis(4-methyl-6-t-butyl phenol); 2,2'-methylenebis(4-ethyl-6-t-butyl phenol); 4,4'-methylene-bis(2,6-di-tert-butylphenol); 4,4'-bis(2,6-di-tert-butylphenol); 4,4'-bis(2-methyl-6-tert-butylphenol); 4,4'-butyldene-bis(3-methyl-6-tert-butyl phenol); 4,4'-isopropylidene-bis(2,6-di-tert-bulylphenol); 2,2'-methylene-bis(4-methyl-6-nonylphenol); 2,2'-isobutyl-idene-bis(4,6-dimethylphenol); 2,2'-methylene-bis(4-methyl-6-cyclohexylphenol); bis(3,5-di-tert-butyl-4-hydroxybenzyl); tris(3,5-di-t-butyl-4-hydroxy isocyanurate; tris(2-methyl-4-hydroxy-5-t-butylphenyl) butane; pentaerythritol tetrakis(3-(3,5-di-tert-butyl-4-hydroxyphenyl) propionate); hexamethylene bis[3-(3,5-di-tert-butyl-4-hydroxyphenyl) propionate]; thiodiethylene bis[3-(3,5-di-tert-butyl-4-hydroxyphenyl) propionate; 2,6-di-tert-dimethyl-amino-p-cresol; 2,6-di-tert-4-(N,N'-dimethylaminomethylphenol); 4,4'-thiobis(2-methyl-6-tert-butylphenol); 2,2'-thiobis(4-methyl-6-tert-butylphenol); and bis(3-methyl-4-hydroxy-5-tert-butylbenzyl)-sulfide.

14. The method of claim 1, wherein the antioxidant is selected from the group consisting of octadecyl-3,5-di-t-butyl-4-hydroxy-hydrocinnamate (NAUGARD 76, Uniroyal Chemical; IRGANOX 1076, Ciba-Geigy); tetrakis {methylene (3,5-di-t-butyl-4-hydroxy-hydrocinnamate)}methane (NAUGARD 10, Uniroyal Chemical; IRGANOX 1010, Ciba-Geigy); 2,2'-oxamido bis {ethyl-3-(3,5-di-t-butyl-4-hydroxyphenyl)}propionate (NAUGARD XL-1, Uniroyal Chemical); 1,2-bis(3,5-di-t-butyl-4-hydroxyhydro-cinnamoyl) hydrazine (IRGANOX MD 1024,Ciba-Geigy); 1,3,5-tris(3,5-di-t-butyl-4-hydroxybenzyl)-s-triazine-2,4,6 (1H,3H,5H) trione (IRGANOX 3114,Ciba-Geigy); 1,3,5-tris(4-t-butyl-3-hydroxy-2,6-dimethylbenzyl)-s-triazine-2,4, 6-(1H,3H,5H) trione (CYANOX 1790, American Cyanamid Co.); 1,3,5-trimethyl-2,4,6-tris(3,5-di-t-butyl-4-hydroxy-benzyl)benzene (ETHANOX 330, Ethyl Corp.); 3,5-di-t-butyl-4-hydroxyhydrocinnamic acid triester with 1,3,5-tris (2-hydroxyethyl)-5-triazine-2,4,6 (1H,3H,5H)-trione, and bis(3,3-bis(4-hydroxy-3-t-butylphenyl) butanoic acid)glycolester.

15. The method of claim 1, wherein the dedust composition has a flash point of at least 285° C.

16. The method of claim 1, wherein the dedust composition further comprises an emulsifying agent.

17. The method of claim 16, wherein the emulsifying agent comprises a non-ionic emulsifier.

18. The method of claim 1, wherein the triacyl glyceride has a Slip melting point of from 10° C. to 21° C.

19. The method of claim 1, wherein the dedust composition has a flash point of from about 280° C. to about 400° C.

* * * * *